F. J. HOBSON.
TRACTOR ATTACHMENT FOR MOTOR VEHICLES.
APPLICATION FILED DEC. 29, 1915.
1,246,097.
Patented Nov. 13, 1917.
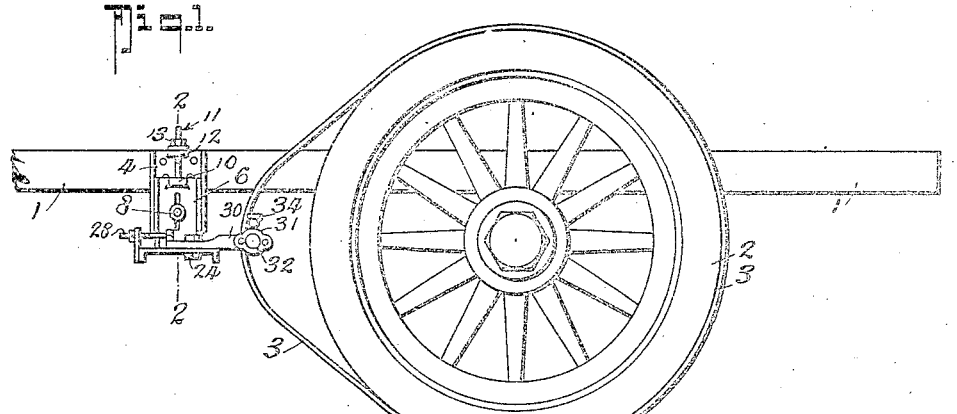
INVENTOR
F. J. Hobson.
BY
Fred G Dieterich &Co
ATTORNEYS

UNITED STATES PATENT OFFICE.

FRANCIS J. HOBSON, OF LOS ANGELES, CALIFORNIA, ASSIGNOR TO E. CLARKSON SEWARD, TRUSTEE, OF BROOKLYN, NEW YORK.

TRACTOR ATTACHMENT FOR MOTOR-VEHICLES.

1,246,097.   Specification of Letters Patent.   Patented Nov. 13, 1917.

Application filed December 29, 1915. Serial No. 69,235.

*To all whom it may concern:*

Be it known that I, FRANCIS J. HOBSON, residing at Los Angeles, in the county of Los Angeles and State of California, have invented certain new and useful Improvements in Tractor Attachments for Motor-Vehicles, of which the following is a specification.

My present invention, which in its general nature seeks to provide an improved means for securing traction for motor vehicle wheels when running through sand or on soft or rocky roads, wet and slippery pavements, more particularly has for its purpose to provide certain improvements in the tractor attachment disclosed in my Patent No. 1,154,635, granted September 28, 1915.

In the tractor attachment disclosed in my patent mentioned, the same is shown as more particularly designed for being connected with the running board of the motor vehicle. My present invention provides an improved means for connecting the attachment to the auto vehicle frame whereby the said attachment may be readily attached to vehicles that have no running boards and to the said frame of the vehicle in such a manner that the traction attachment may be readily adjusted for being operatively connected with the general run of different makes of motor vehicles and located either to the front or to the rear of the tractor wheels, as conditions may require.

Another object of my present invention is to provide an attachment for motor vehicles of the general character stated, of a simple, economically constructed and easily manipulated bracket device for holding the endless belt guide or idler roller and adapted to be extended in three directions to readily adjust the said guide roller whereby to set the endless tractor belt in the desired position for engagement with the tractor wheel.

With further objects in view that will later appear my invention consists in the peculiar combination and novel arrangement of the parts hereinafter fully described, specifically pointed out in the appended claims and illustrated in the accompanying drawings, in which:

Figure 1 is a side elevation of so much of a motor vehicle as is necessary to illustrate the application of my invention.

Fig. 2 is a transverse section thereof taken on the line 2—2 on Fig. 1.

Fig. 3 is a transverse section of the bracket device taken on the line 3—3 on Fig. 2, looking in the direction of the arrow *a*, parts being in elevation.

Fig. 4 is a plan view of the longitudinally adjustable idler or guide roller member and laterally adjustable bracket member, on which the said guide member is adjustably mounted.

In my present invention, the traction attachments include an endless belt 3 adapted to be readily slipped onto the tractor wheel 2 and over a holding member, in the nature of a roller 33, which in my present construction of tractor attachment is adapted to be laterally and vertically positioned relatively to the framing 1 of the machine, and thereby provide for the operative connection of the endless tractor belt to the said wheel 2.

Roller 33 is journaled in and is endwise slidable through the bearings 31—31 on the forked members 30—30 and is held within the bearings 31 by the cap plates 32, as shown. 34 designate grease cups for the bearings 31.

4 designates a channel iron attached to the frame member 1 and pendent therefrom and the said iron 4 includes an apertured outwardly extended lug 12, the purpose of which will presently appear.

A second bracket member 60, also of channel iron, is pendently mounted on bracket member 4 and the said member 60 includes a vertical extension 6 that has an elongated slot 7 and is held for different vertical adjustments on the said member 4, by a clamp nut 8, and the vertically adjustable hanger bolt 11 that engages an outwardly projected lip 10 on the extension 6 and passes through the apertured member 12 of the bracket 4 to receive the adjusting nut 13, as is best shown in Fig. 2.

The said second bracket member 60 also includes a horizontal extension 61, on which is supported, for lateral adjustment, with respect to the frame 1, a channel iron bracket 15 having a longitudinal slot 16 to receive a screw stud 17 having a pendent block 18 and fixedly held on the extension 61 by the clamp nut 19.

Bracket 15 is adjusted laterally to the frame 1 by a screw bolt 20 whose head portion engages the block 18, and whose threaded end passes through an apertured ear 22 of the bracket 15 and which receives the adjusting nut 21, as shown.

Bracket 15 has a slot 23 at right angles to the slot 16 through which passes an adjusting bolt 24 pendent from the bracket 25 that carries the idler roller 33, and clamps the said bracket to its adjusted positions, to which it is shifted by a screw bolt 28 whose head engages a lug 26 on the bracket 25 and an apertured member 27 fast on one edge of the bracket 15.

29 indicates the adjusting nut or bolt 28.

From the foregoing description, taken in connection with the drawing, the complete construction of my present invention will be readily apparent.

By reason of providing a bracket device, as shown and described, a simple effective and easily manipulated means is provided for operatively positioning the idler or guide roller with respect to the traction wheel to which it is intended to apply the endless tractor belts, since in my said construction of bracket the bearings for the said idler roller can be adjusted vertically, laterally and longitudinally (backwardly and forwardly) with respect to the side frame of the motor vehicle.

The endless belt, in practice, of rubber, or other suitable material, when not required for use, can be carried in the tool box and after the belt has been used, it can be quickly removed, by loosening one of the cap plates 32 to free the end of the roller 33 which can then be easily slid endwise out of the bearings 31—31 and from engagement with the belt. After the belt is removed, the roller 33, is shoved back and held in place by closing over the cap plate.

By reason of providing a bracket device for sustaining the guide roller 33, my improved tractor attachment can be readily so applied that the said roller 33 may be positioned either to the front or to the rear of the tractor wheel.

What I claim is:

1. In a motor vehicle, the combination with the wheel and an adjacent portion of the vehicle, of a bracket device supported on said portion of the vehicle and extensible longitudinally with respect to the vehicle and wheel, an idler roller mounted on the said device in a plane parallel with the wheel axis, and an endless belt that takes around the roller and the wheel.

2. In a motor vehicle, the combination with the wheel and the adjacent frame portion of the vehicle; of a bracket device supported on the frame and including members extensible laterally, longitudinally, and vertically with respect to the frame and the wheel, an idler roller mounted on the said device in a plane parallel with the wheel axis and an endless belt that takes around the roller and the wheel.

3. In a motor vehicle, the combination with the frame, the tractor wheel; of a guide roller coöperative with the wheel, an endless belt that takes over the wheel and the guide roller, means for supporting the said roller in alinement with the tractor wheel, said means being adjustable vertically, laterally and longitudinally with respect to the wheel and the frame, the said means including a bracket member secured to and vertically adjustable on the frame, a second bracket member secured to and laterally adjustable relatively to the frame, and a third bracket member secured to the second bracket member and longitudinally adjustable with respect to the said frame, said third bracket member having bearings for the guide roller.

4. In a motor vehicle, the combination with the frame, the tractor wheel; of a guide roller coöperative with the wheel, an endless belt that takes over the wheel and the guide roller, means for supporting the said roller in alinement with the tractor wheel, said means being adjustable vertically, laterally and longitudinally with respect to the wheel and the frame, the said means including a bracket member secured to and vertically adjustable relatively to the frame, a second bracket member secured to and laterally adjustable relatively to the frame, a third bracket member secured to the second bracket member and longitudinally adjustable with respect to the said frame, said third bracket member having bearings for the guide roller, said guide roller being endwise removable from the said bearings and means for holding the said guide roller from endwise movement in the bearings.

5. A traction belt guide attachment for motor vehicles comprising a device adapted to be engaged by the belt, and a sectional bracket member for carrying said device, said bracket member being carried by the vehicle and having provision whereby said device may be rearwardly, longitudinally and vertically moved for adjustment as to position with relation to the vehicle wheel.

FRANCIS J. HOBSON.